US011493934B2

(12) United States Patent
Lu et al.

(10) Patent No.: US 11,493,934 B2
(45) Date of Patent: Nov. 8, 2022

(54) GPS DATA INTEGRITY VERIFICATION

(71) Applicant: GM GLOBAL TECHNOLOGY OPERATIONS LLC, Detroit, MI (US)

(72) Inventors: Yaojie Lu, Whitby (CA); David A. Bodenmiller, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 549 days.

(21) Appl. No.: 16/534,440

(22) Filed: Aug. 7, 2019

(65) Prior Publication Data

US 2021/0041890 A1 Feb. 11, 2021

(51) Int. Cl.
*G05D 1/02* (2020.01)
*G01S 19/14* (2010.01)
*G01C 22/00* (2006.01)
*G05D 1/00* (2006.01)
*G01S 19/20* (2010.01)

(52) U.S. Cl.
CPC .......... *G05D 1/0278* (2013.01); *G01C 22/00* (2013.01); *G01S 19/14* (2013.01); *G01S 19/20* (2013.01); *G05D 1/0088* (2013.01); *G05D 2201/0213* (2013.01)

(58) Field of Classification Search
CPC .............. G05D 1/0278; G05D 1/0088; G05D 2201/0213; G01C 22/00; G01S 19/14; G01S 19/20; G01S 19/23
See application file for complete search history.

(56) References Cited

U.S. PATENT DOCUMENTS

2020/0225363 A1  7/2020  Samii et al.
2020/0278692 A1*  9/2020  Zhu ........................ G05D 1/027

\* cited by examiner

*Primary Examiner* — Yuen Wong
(74) *Attorney, Agent, or Firm* — Cantor Colburn LLP

(57) ABSTRACT

An autonomous vehicle, system and method of operating an autonomous vehicle. The system includes a communication module and a processor. The communication module sends a first set of Global Positioning Satellite (GPS) data over a first communication channel and a second set of GPS data over a second communication channel. The second set of GPS data is an authenticated data set. The processor operates the autonomous vehicle using the first set of GPS data, and compares the first set of GPS data to the second set of GPS data to verify the integrity of the first set of GPS data. A first value for a vehicle parameter based on the first set of GPS data is compared to a second value for the vehicle parameter based on data from a vehicle-based sensor. The first set of GPS data is rational when the difference is less than a selected threshold.

20 Claims, 8 Drawing Sheets

GPS DATA INTEGRITY VERIFICATION

INTRODUCTION

The subject disclosure relates to operation and navigation of autonomous vehicles and, in particular, to a method of ensuring integrity of Global Positioning Satellite (GPS) data used in navigation of the autonomous vehicle.

An autonomous vehicle is able to navigate in part by using GPS data. The quality of the navigation depends in part on the internal consistency or lack of corruption of the GPS data. Cyber-attacks, hardware errors, or software errors on a GPS system, GPS data communication channels or GPS data provider can result in corrupted GPS data being received by a downstream autonomous vehicle computer control system and can therefore be detrimental to effective operation of the autonomous vehicle when corruption goes undetected. Accordingly, it is desirable to ensure the integrity of GPS data used by the autonomous vehicle computer control system for autonomous vehicle navigation.

SUMMARY

In one exemplary embodiment, a method of operating an autonomous vehicle is disclosed. A communication module sends a first set of Global Positioning Satellite (GPS) data over a first communication channel to a control system of the autonomous vehicle. The communication module sends a second set of GPS data over a second communication channel the control system of the autonomous vehicle, wherein the second set of GPS data is an authenticated data set. The autonomous vehicle operates using the first set of GPS data. The first set of GPS data is compared to the second set of GPS data to verify the first set of GPS data.

In addition to one or more of the features described herein, the first communication channel is an Ethernet communication channel and the second communication channel is a Controller Area Network. Comparing the first set of GPS data to the second set of GPS data further includes comparing a timestamp of the first set of GPS data to a timestamp of the second set of GPS data. The method further includes verifying an integrity of the first set of GPS data from a signal-by-signal comparison of the first set of GPS data to the second set of GPS data. The method further includes calculating a first value for a parameter of the autonomous vehicle using the first set of GPS data, calculating a second value for the parameter of the autonomous vehicle using a set of data obtained at a vehicle-based sensor, and determining a rationality of the first set of GPS data when a difference between the first value and the second value is less than a selected threshold. The parameter of the autonomous vehicle is at least one of a distance travelled by the autonomous vehicle, a heading of the autonomous vehicle, a yaw rate of the autonomous vehicle, and a lateral offset of the autonomous vehicle. The method further includes receiving the first set of GPS data and storing the first set of GPS data in a circular buffer and comparing the second set of GPS data to the first set of GPS data within a window of the circular buffer. The method further includes operating the autonomous vehicle in a failure mode when comparison of the first set of GPS data to the second set of GPS data fails to verify the first set of GPS data.

In another exemplary embodiment, a system for operating an autonomous vehicle is disclosed. The system includes a communication module and a processor. The communication module sends a first set of Global Positioning Satellite (GPS) data over a first communication channel and a second set of GPS data over a second communication channel, wherein the second set of GPS data is an authenticated data set. The processor is configured to operate the autonomous vehicle using the first set of GPS data, and compare the first set of GPS data to the second set of GPS data to verify the first set of GPS data.

In addition to one or more of the features described herein, the processor is further configured to compare a timestamp of the first set of GPS data to a timestamp of the second set of GPS data. The processor is further configured to verify an integrity of the first set of GPS data from a signal-by-signal comparison of the first set of GPS data to the second set of GPS data. The processor is further configured to calculate a first value for a parameter of the autonomous vehicle using the first set of GPS data, calculate a second value for the parameter of the autonomous vehicle using a set of data obtained at a vehicle-based sensor, and determine a rationality of the first set of GPS data when a difference between the first value and the second value is less than a selected threshold. The parameter of the autonomous vehicle is at least one of a distance travelled by the autonomous vehicle, a heading of the autonomous vehicle, a yaw rate of the autonomous vehicle, and a lateral offset of the autonomous vehicle. The processor is further configured to store the first set of GPS data in a circular buffer and compare the second set of GPS data to the first set of GPS data within a window of the circular buffer.

In another exemplary embodiment, an autonomous vehicle is disclosed. The autonomous vehicle includes a communication module and a processor. The communication module sends a first set of Global Positioning Satellite (GPS) data over a first communication channel and a second set of GPS data over a second communication channel, wherein the second set of GPS data is an authenticated data set. The processor is configured to operate the autonomous vehicle using the first set of GPS data, and compare the first set of GPS data to the second set of GPS data to verify the first set of GPS data.

In addition to one or more of the features described herein, the processor is further configured to compare a timestamp of the first set of GPS data to a timestamp of the second set of GPS data. The processor is further configured to verify an integrity of the first set of GPS data from a signal-by-signal comparison of the first set of GPS data to the second set of GPS data. The processor is further configured to calculate a first value for a parameter of the autonomous vehicle using the first set of GPS data, calculate a second value for the parameter of the autonomous vehicle using a set of data obtained at a vehicle-based sensor, and determine a rationality of the first set of GPS data when a difference between the first value and the second value is less than a selected threshold. The parameter of the autonomous vehicle is at least one of a distance travelled by the autonomous vehicle, a heading of the autonomous vehicle, a yaw rate of the autonomous vehicle, and a lateral offset of the autonomous vehicle. The processor is further configured to store the first set of GPS data in a circular buffer and compare the second set of GPS data to the first set of GPS data within a window of the circular buffer.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
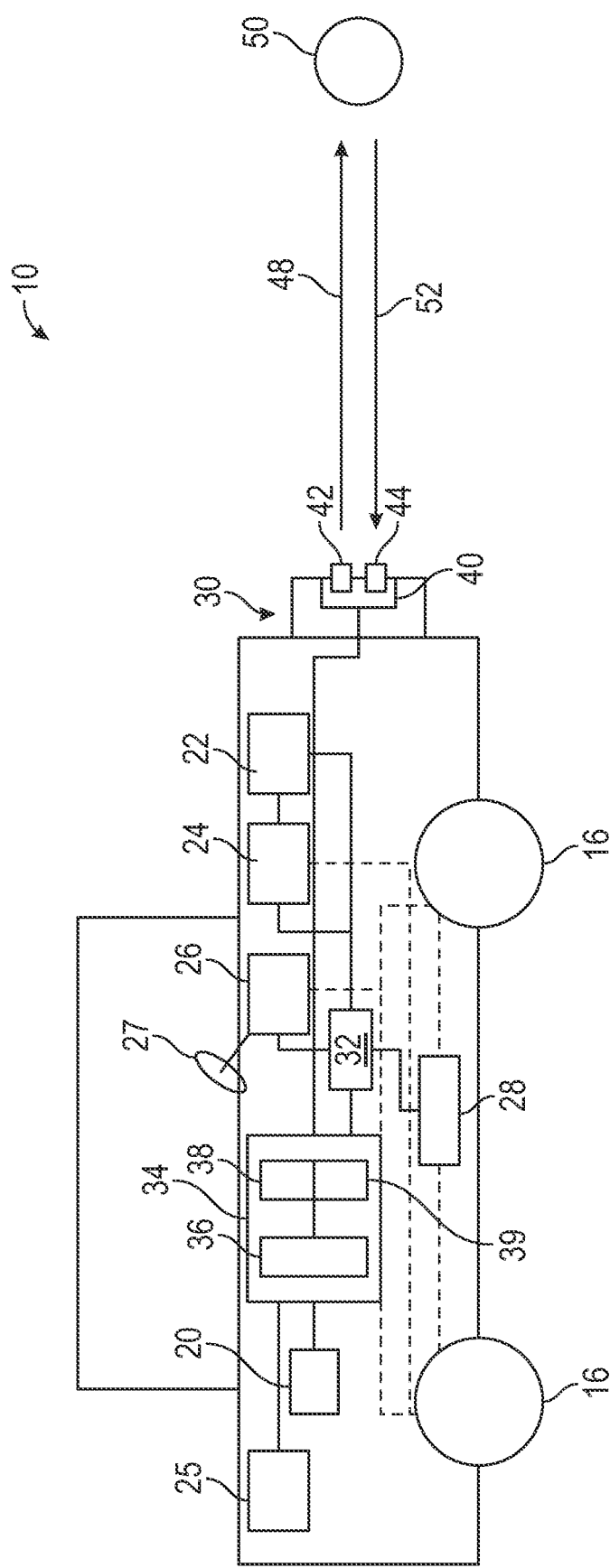
FIG. 1 shows an autonomous vehicle in an embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of the levels 1 through 5.

The autonomous vehicle 10 generally includes at least a navigation system 20, a propulsion system 22, a transmission system 24, a Precise Positioning System (PPS) communication system 25, a steering system 26, a brake system 28, a sensor system 30, an actuator system 32, and a controller 34. The navigation system 20 determines a trajectory plan for automated driving of the autonomous vehicle 10. The propulsion system 22 provides power for creating a motive force for the autonomous vehicle 10 and may, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a radar system 40 that senses objects in an exterior environment of the autonomous vehicle 10 and provides various parameters of the objects useful in locating the position and relative velocities of various agent vehicles in the environment of the autonomous vehicle. Such parameters can be provided to the navigation system 20. In operation, the transmitter 42 of the radar system 40 sends out a radio frequency (RF) reference signal 48 that is reflected back at the autonomous vehicle 10 by one or more objects 50 in the field of view of the radar system 40 as one or more reflected echo signals 52, which are received at receiver 44. The one or more echo signals 52 can be used to determine various parameters of the one or more objects 50, such as a range of the object, Doppler frequency or relative radial velocity of the object, and azimuth, etc. The sensor system 30 includes additional sensors, such as digital cameras, for identifying road features, etc.

The PPS communication module 25 includes one or more transceivers for sending and receiving navigation data, such as Precise Positioning System (PPS) data, which includes, but is not limited to, Global Positioning Satellite (GPS) data. As discussed with respect to FIG. 3, the GPS data can be in the form of a first set of GPS data that is sent by the PPS communication module 25 to a processor 36 at a high transmission rate over an unsecured communication channel and a second set of GPS data that is redundant to the first set of GPS data and that is sent by the PPS communication module 25 to the processor 36 at a low transmission rate over a secured communication channel. The GPS data is used to locate the autonomous vehicle 10 to allow for navigation of the autonomous vehicle.

The navigation system 20 builds a trajectory for the autonomous vehicle 10 based on radar parameters from the radar system 40, the received GPS data from the PPS communication system 25 and any other relevant parameters. The controller 34 can provide the trajectory to the actuator system 32 to control the propulsion system 22, transmission system 24, steering system 26, and/or brake system 28 in order to navigate the autonomous vehicle 10 with respect to the object 50.

The controller 34 includes a processor 36 and a computer readable storage device or storage medium 38. The computer readable storage medium includes programs or instructions 39 that, when executed by the processor 36, operate the autonomous vehicle based on radar parameters and GPS data. The computer readable storage medium 38 may further include programs or instructions 39 that when executed by the processor 36, perform tests to ensure an integrity of GPS data obtained at the autonomous vehicle and used for navigation of the autonomous vehicle.

Figure 2:
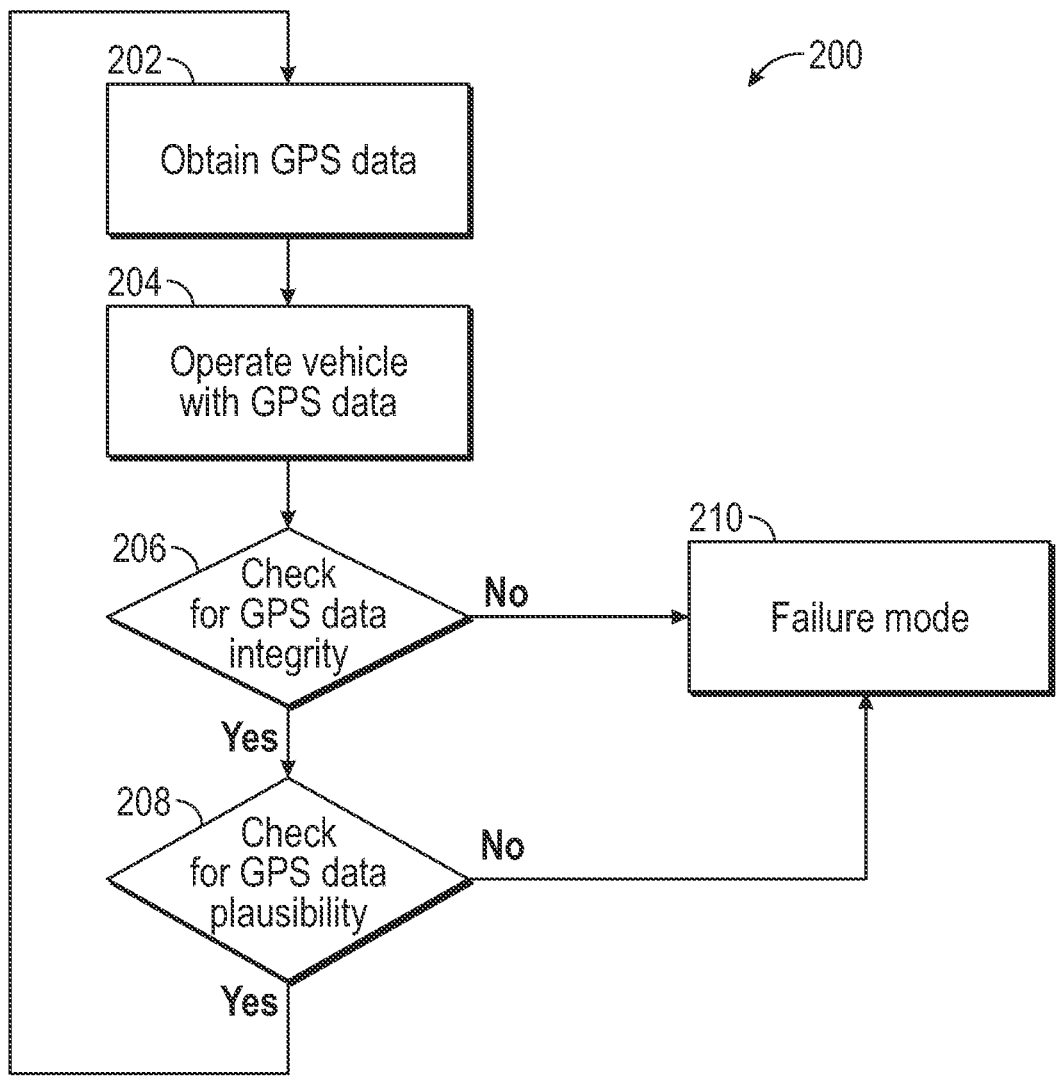
FIG. 2 shows a flowchart illustrating a method for operating the autonomous vehicle based on GPS data.

FIG. 2 shows a flowchart 200 illustrating a method for operating the autonomous vehicle 10 based on GPS data in an embodiment. In box 202, GPS data is obtained or received at the autonomous vehicle via the PPS communication system 25, FIG. 1. As discussed herein, the GPS data includes a first set of GPS data and second set of GPS data. In box 204, the autonomous vehicle is operated using the first set of GPS data. In box 206, the first set of GPS data and the second set of GPS data are compared to each other in order to determine the integrity of the first set of GPS data. In various embodiments, comparison of the first set of GPS data to the second set of GPS data includes a signal-by-signal comparison of the first and second set. If the first set of GPS data does not pass a test for integrity, the method proceeds to box 210 in which the autonomous vehicle operates in a failure mode. Failure mode operation can include alerting the driver and handing operation of the autonomous vehicle over to the driver, etc. Returning back to box 206, if the GPS data passes the test for integrity, then the method proceeds to box 208. In box 208, the first set of GPS data is checked for rationality or plausibility by comparing a predicted motion of the autonomous vehicle based on the first set of GPS data with an actual motion as sensed by the autonomous vehicle. The rationality or plausibility of the GPS data is a measure of a degree to which the motion and/or position of the autonomous vehicle as predicted using the GPS data matches the actual motion and/or position of the autonomous vehicle. If the first set of GPS data is not determined to be rational, the method proceeds to box 210 in which the autonomous vehicle operates in the failure mode. Returning back to box 208, if the GPS data is considered to be rational, then the method proceeds to box 202 in which a next first and second set of GPS data is obtained. The method therefore returns to box 202 on a periodic basis.

Figure 3:
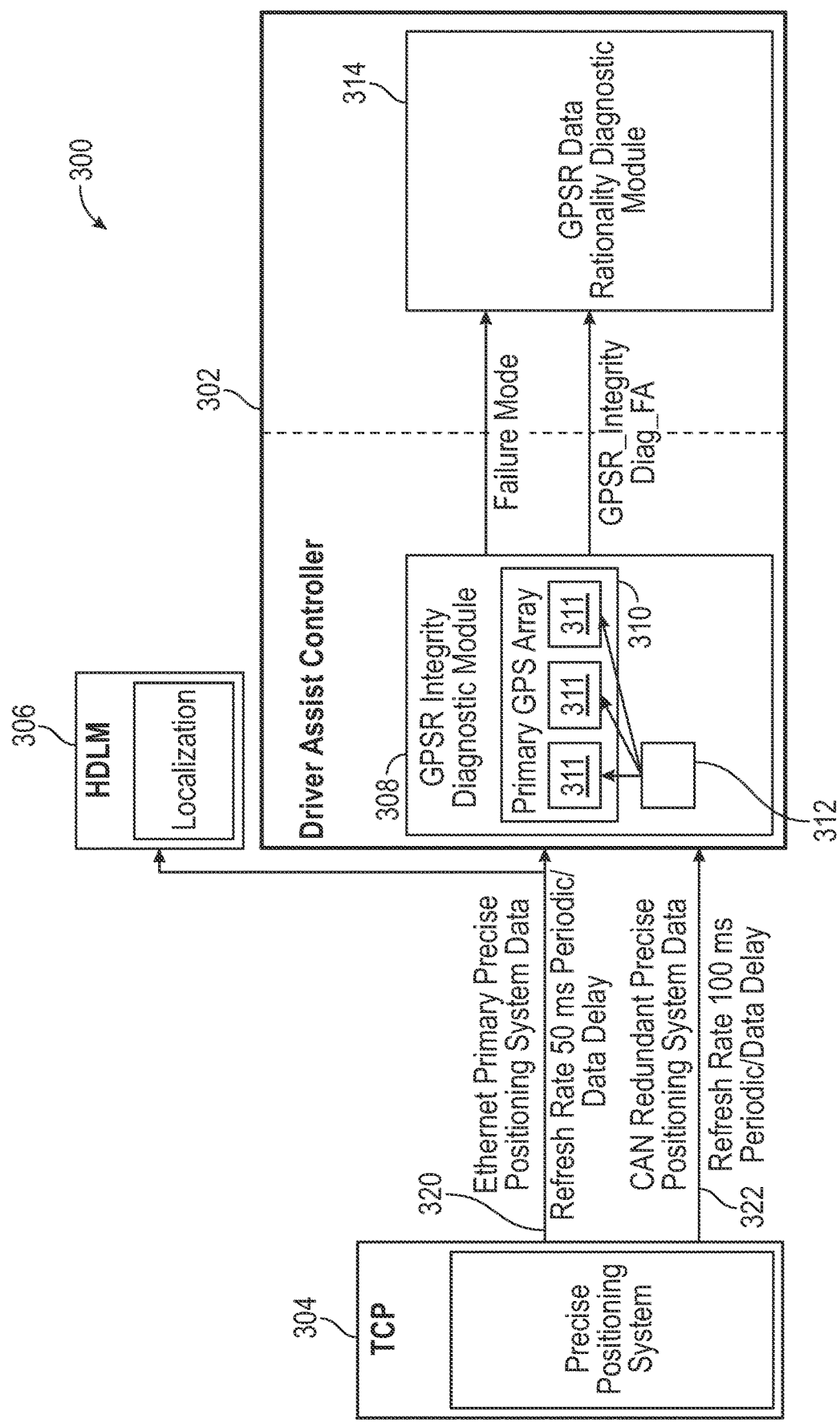
FIG. 3 shows a schematic diagram of a system for diagnosing an integrity of GPS data received at the autonomous vehicle.

FIG. 3 shows a schematic diagram of a system 300 for diagnosing the integrity of GPS data received at the autonomous vehicle 10 according to the method shown in FIG. 2. The system 300 includes a Driver Assist Controller (DAC) 302 that performs the diagnostics on the GPS data. The DAC 302 can be a program operating at processor 36, in an embodiment. A Telematics Communication Platform (TCP) module 304 provides PPS data to the Driver Assist Controller 302. The TCP module 304 transmits two sets of GPS data. The first set of GPS data is a Primary PPS Data group which is also referred to herein as Ethernet GPS data 311. The Ethernet GPS data 311 is transmitted to the Driver Assist Controller 302 over a first communication channel 320 at a high refresh rate (i.e., a 50 millisecond refresh period, with less than 1 millisecond typical data delay). The Ethernet GPS data 311 is unprotected GPS data that can be vulnerable to cyberattack or other loss of data integrity due to hardware or software errors through the first communication channel. The second set of GPS data is a Redundant PPS Data group which is also referred to herein as a Controller Area Network (CAN) GPS data. The CAN GPS data 312 is transmitted to the Driver Assist Controller 302 over a second communication channel 322 (e.g., a Controller Area Network) at a low refresh rate (i.e., a 100 millisecond refresh period and data delay). The CAN GPS data 312 is authenticated GPS data.

The Ethernet GPS data 311 is also transmitted to a High Definition Localization Module (HDLM) 306, which operates and navigates the autonomous vehicle 10 based on the Ethernet GPS data. The HDLM 306 therefore operates using unprotected GPS data and does not have the ability to determine whether the Ethernet GPS data 311 is corrupted or has been intentionally manipulated. The Driver Assist Controller 302 performs tests on the GPS data in order to ensure that uncorrupted GPS data is used at the HDLM 306 or to identify the occurrence of data corruption and take appropriate action at the autonomous vehicle 10.

The Driver Assist Controller 302 includes a GPS Integrity Diagnostic (GPSR_IGD) Module 308 that diagnoses or determines the integrity of the Ethernet GPS data 311. The GPSR_IGD Module 308 receives the Ethernet GPS data 311 and stores the Ethernet GPS data in a circular buffer 310, also referred to as a Primary GPS Array. CAN GPS data 312 arrives at the GPSR_IGD Module 308 and is compared to the data in the circular buffer 310. If the Ethernet GPS data 311 in the circular buffer 310 does not match the authenticated CAN GPS data 312, the GPSR_IGD Module 308 reports a 'GPS Integrity Fault Active=True' value. When the Ethernet GPS data 311 matches the CAN GPS data 312, a 'GPS Integrity Fault Active=False' value is reported. When no fault is indicated, the Driver Assistance Controller 302 can continue data diagnosis by determining the rationality of the GPS data using a Rationality Diagnostics Module (RDM) 314, which is further discussed with reference to FIG. 6.

Figure 4:
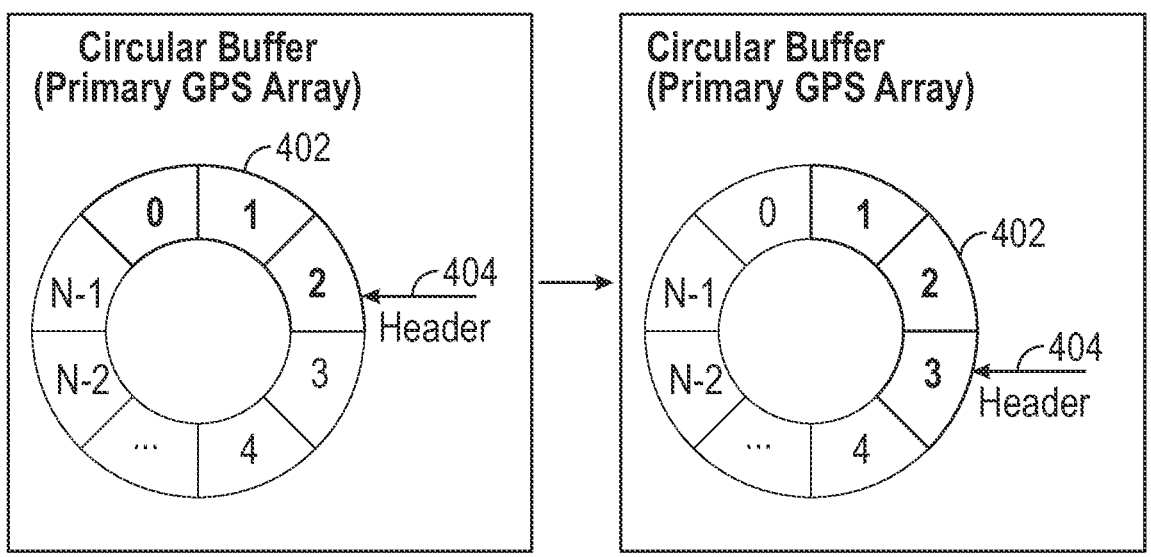
FIG. 4 shows operation of an illustrative circular buffer used to store the GPS data.

FIG. 4 shows operation of an illustrative circular buffer 310 used in the GPSR_IGD Module 308 of FIG. 3. The circular buffer 310 has a fixed size including N buffer locations and is used to store the Ethernet GPS data 311 when it is received. The circular buffer 310 includes a moving window 402 of size k, wherein k<N. Each time a new packet of Ethernet GPS data 311 is received, the newly-received GPS data is placed in the next available buffer location. The moving window has a header 404 that is maintained to point to the buffer location in the circular buffer 310 having the most recently-added GPS data. When new data is added to the circular buffer 310, the location of the header 404 is updated to reference the memory location of the new data. As shown, the circular buffer 310 includes a window having a size k=3. At a first time, the window 402 covers buffer locations 0, 1 and 2. For this configuration, newly received Ethernet GPS data 311 is placed at the fourth buffer location and the window location is incremented to cover buffer locations 1, 2 and 3.

After the circular buffer 310 is updated, a data matching algorithm searches through the circular buffer 310 to attempt to match recent CAN GPS data 312 to the Ethernet data stored in the circular buffer. A counter is defined to count the amount of data stored in the circular buffer 310, so the CAN GPS data 312 is compared only to the existing buffered data when software is initialized and the buffer is not full.

Each GPS data group is timestamped with a Global Time when the data group is generated. The timestamp is the same regardless of whether the GPS data is transmitted over the first communication channel 320 or the second communication channel 322. The data matching algorithm therefore begins by searching for a match in time stamps in the stored Ethernet GPS data 311 and the CAN GPS data 312. Once the timestamp of the CAN GPS data 312 matches the timestamp of one of the Ethernet GPS data stored in the circular buffer 310, the CAN GPS data 312 is compared to the Ethernet GPS data 311 have the same timestamp.

Figure 5:
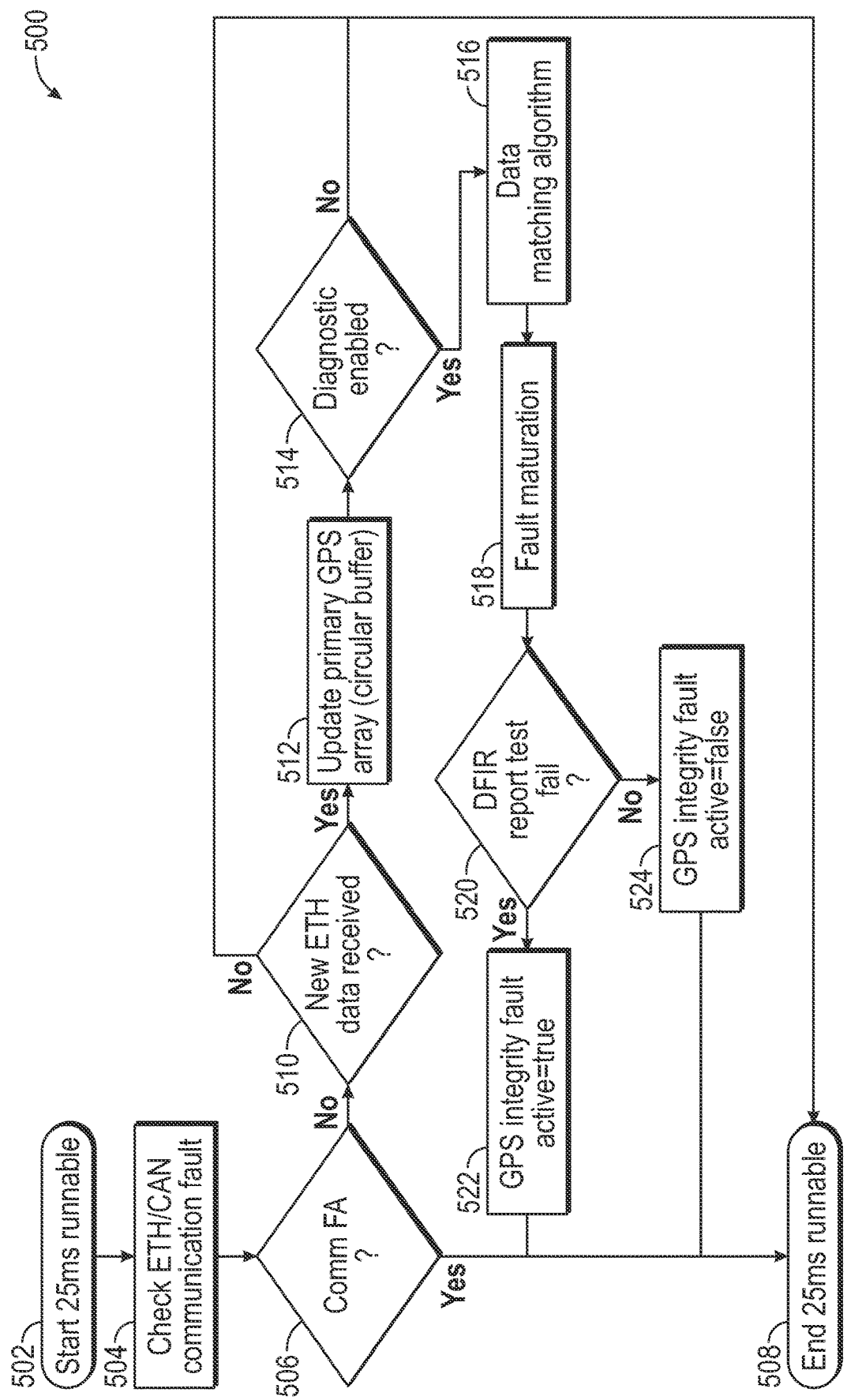
FIG. 5 shows a flowchart illustrating operation of a GPS data integrity diagnosis program.

FIG. 5 shows a flowchart 500 illustrating operation of a GPS data integrity diagnostic program operable at the GPSR_IGD Module 308. In box 502, the diagnostic program is started. In box 504, the program checks to see if there is a communication fault in either of the Ethernet channel (lost communication) or the CAN channel (lost communication or data corruption). The check produces a 'Communication Fault Active=True' or 'Communication Fault Active=False' signal. In box 506, when 'Fault Active=True' is determined, the program proceeds to box 508 in which the runnable program is ended.

Returning to box 506, when 'Communication Fault Active=False', the program proceeds to box 510. At box 510, the program checks for whether new Ethernet GPS data has been received. If no new Ethernet GPS data is received, the program proceeds to box 508 wherein the program ends. If however new Ethernet GPS data is received, the program proceeds to box 512. In box 512, the circular buffer is updated to include the new Ethernet GPS data. In box 514, if a data diagnostic algorithm is disabled, then the program proceeds to box 508 where the program ends. If however at box 514, the data diagnostic algorithm is enabled, then the program proceeds to box 516. In box 516, a data matching algorithm is performed to compare the stored Ethernet GPS data to CAN GPS data to determine whether the Ethernet GPS data has been corrupted or otherwise has a fault. In box 518, the GPS data having a fault undergoes a fault maturation in which the data either remains a fault that can affect the autonomous vehicle or conditions change in which the fault is no longer an issue to the autonomous vehicle.

In box 520, the integrity of the GPS data is reported. If the fault maturation reports the GPS data to have failed the integrity diagnostic test, then the process continues to box 522 to report 'GPS Integrity Fault Active=True', which results in the autonomous vehicle taking an action such as alerting the driver, handing over operation of the autonomous vehicle to the driver, etc. The method then flows to box 508 to end the program. Returning to box 520, if the GPS data passes the integrity diagnostic test, then the process continues to box 524 to report 'GPS Integrity Fault Active=False'. The method then flows to box 508 to end the runnable program. The rate of the background integrity checking is sufficient to detect GPS data corruption prior to detrimental autonomous vehicle operation. For data that passes the integrity diagnostic test, a rationality test can then be applied, as illustrated with respect to FIGS. 6-9.

Figure 6:
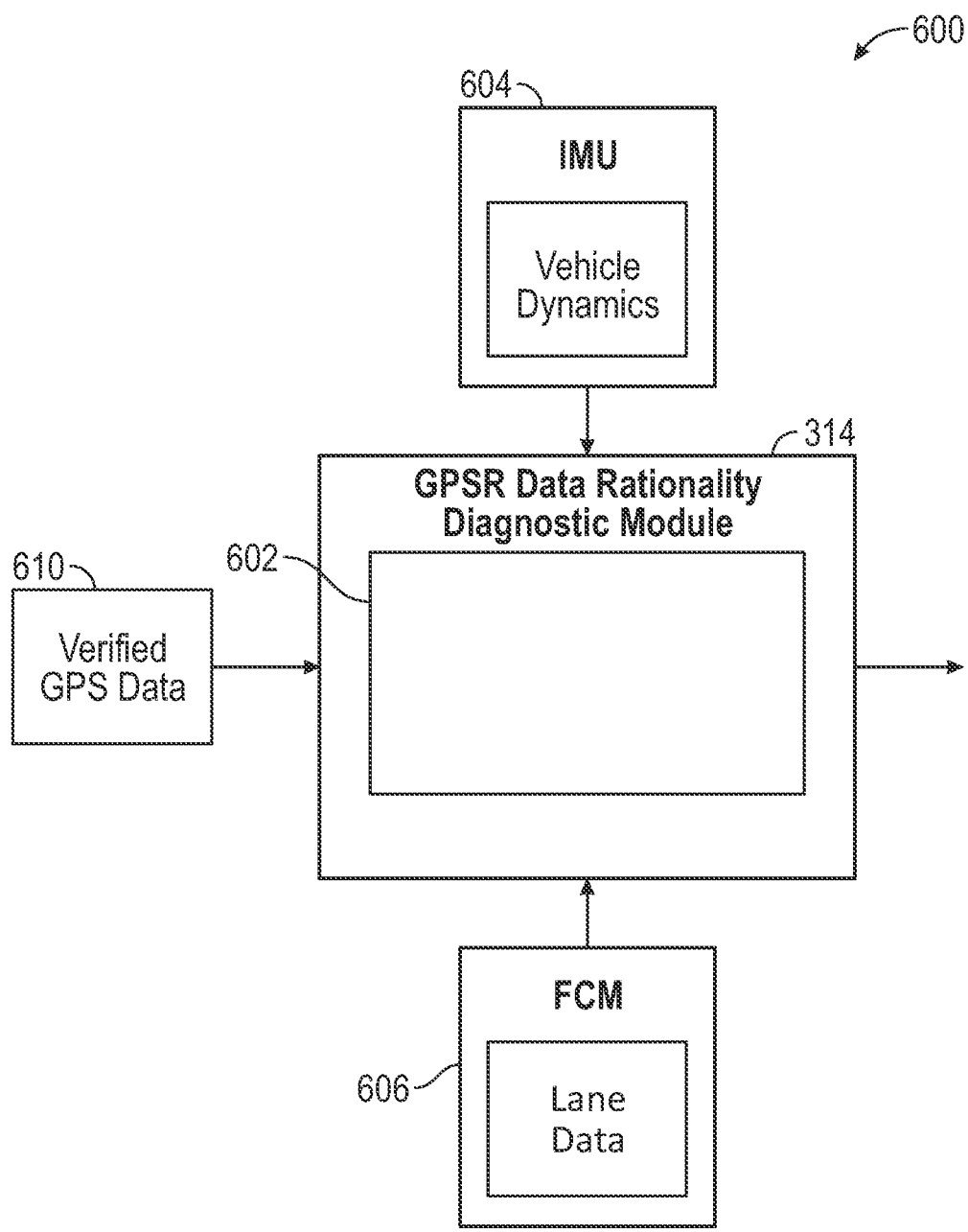
FIG. 6 shows a schematic diagram of a diagnostic module for testing a rationality of the GPS data.

FIG. 6 shows a schematic diagram 600 of a Rationality Diagnostic Module (RDM) 314 for testing the rationality of the GPS data. In various embodiments, the Rationality Diagnostic Module 314 is a component of the Driver Assist Controller 302 (FIG. 3). The Rationality Diagnostic Module 314 operates a circuit 602 for diagnosing the rationality or plausibility of the GPS data. The Rationality Diagnostic Module 314 receives the verified GPS data 610 (i.e., GPS data that has passed the integrity diagnostics test) from the GPSR_IGD Module 308. The circuit 602 further receives vehicle parameters from an Initial Measurement Unit (IMU) 604 and from a Front Camera Module (FCM) 606 or other suitable vehicle-based sensing system, which can be part of the sensor system 30. In various embodiments, the IMU 604 supplies vehicle parameters that include the autonomous vehicle's angular heading, yaw rate, velocity, lateral acceleration, longitudinal acceleration, etc. The FCM 606 provides data regarding the relative location of the autonomous vehicle with respect to roadway objects, such as the curb, lane markings, etc. Data from the IMU 604 and FCM 606 are used at the Rationality Diagnostic Module 314 in order to determine the plausibility or rationality of the verified Ethernet GPS data.

Figure 7:
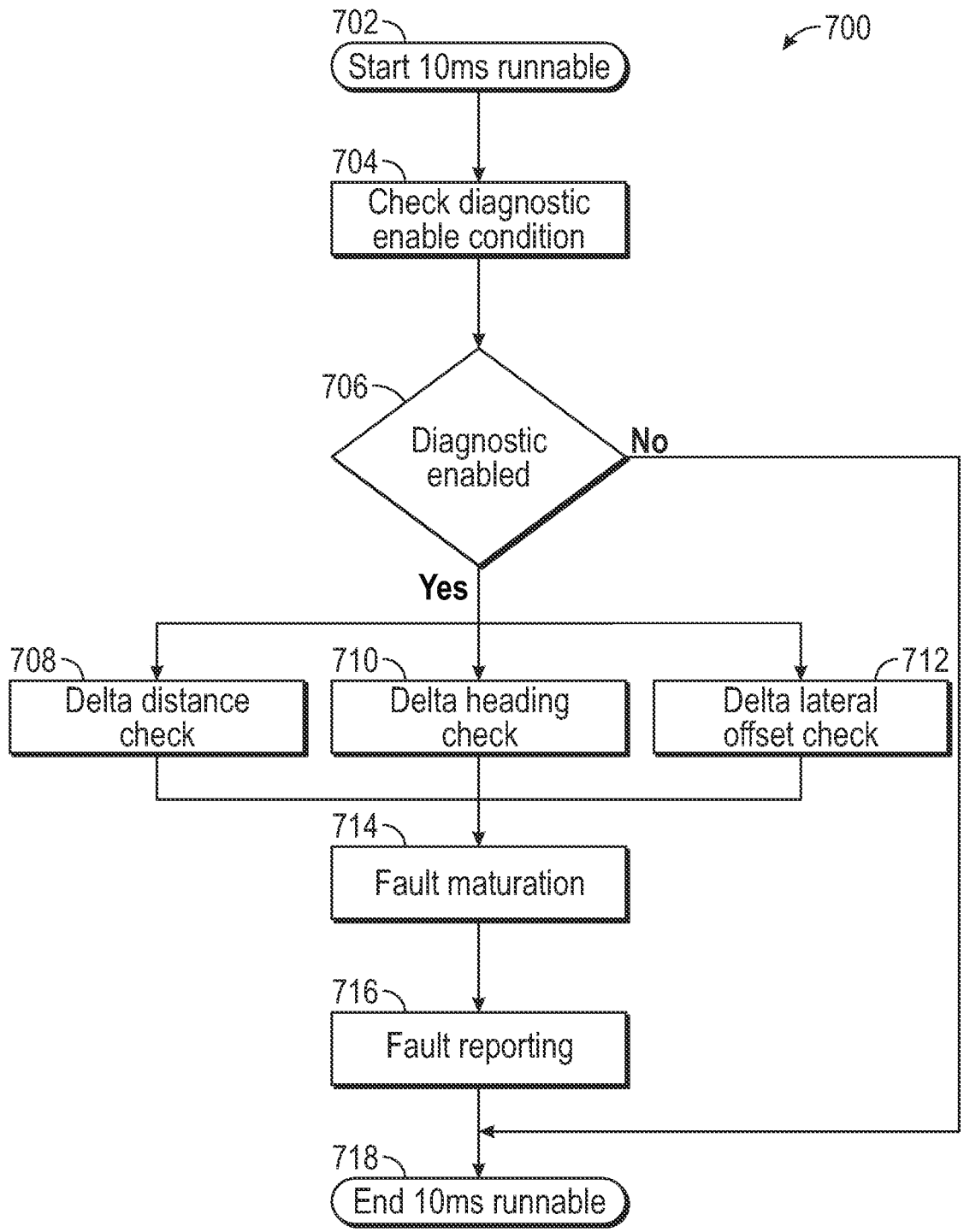
FIG. 7 shows a flowchart illustrating various diagnostic checks performed by the diagnostic module of FIG. 6.

FIG. 7 shows a flowchart 700 illustrating various diagnostic checks performed by the Rationality Diagnostic Module 314 of FIG. 6. In box 702, a runnable rationality diagnostics program is started. In box 704, the program performs an operational check to see that the relevant diagnostic systems (e.g., IMU 604 and FCM 606) are enabled. In box 706, if the diagnostic systems are not enabled, the program proceeds to box 718 where the runnable program ends. Otherwise at box 706, if the diagnostic systems are enabled, the program proceeds to perform the tests of box 708, box 710 and box 712. Box 708 is a distance check that determines the difference between a distance calculated using the GPS data and a distance calculated using vehicle dynamics data. Box 710 is a heading check that determines differences between a heading angle calculated using the GPS data and a heading angle calculated using vehicle dynamics (i.e., vehicle parameters determined using vehicle-based sensors) as well as a difference in yaw rates calculated using GPS data and vehicle dynamics.

Figure 8:
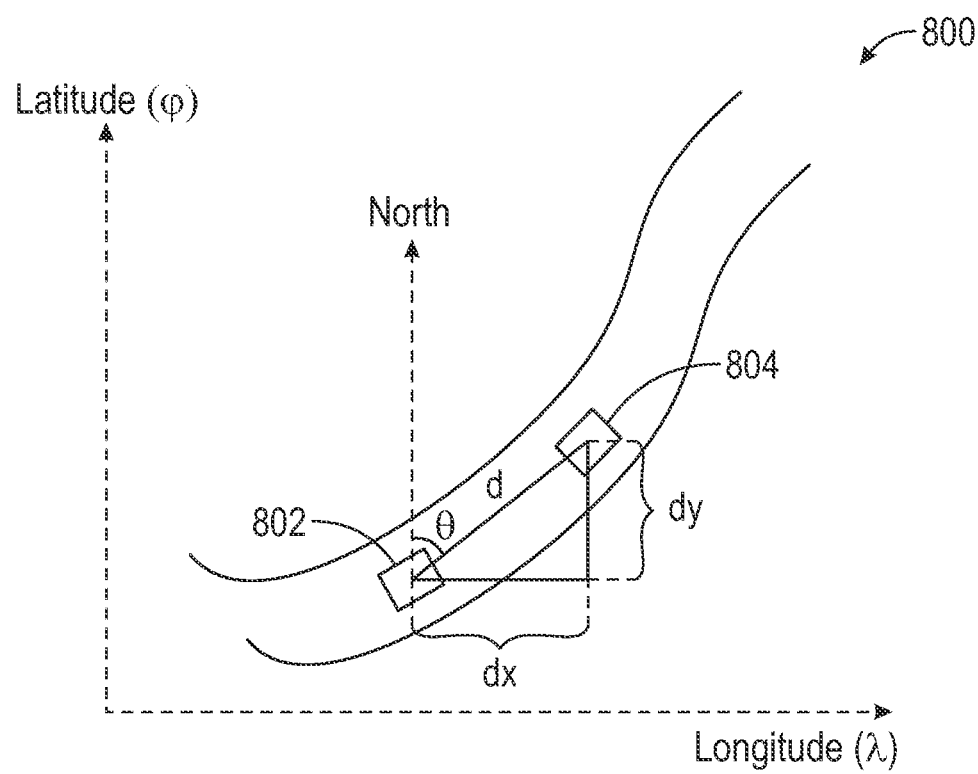
FIG. 8 shows a plan view of a road section having an autonomous vehicle thereon.

Details of the calculations performed in boxes 708 and 710 are discussed herein with respect to FIG. 8. Box 712 is a lateral offset check that compares calculations of a lateral offset of the autonomous vehicle with respect to both right and left lane markers using both GPS data and vehicle dynamics from the FCM 606. Details of the calculations performed in box 712 are discussed herein with respect to FIG. 9.

After the checks of boxes 708, 710 and 712 have been performed, then in box 714, a fault in the GPS data may undergo a fault maturation. In box 716, the state of the matured GPS rationality diagnostics program is reported. If the GPS data has a matured fault, a 'GPS Rationality Fault Active=True' signal is reported and the autonomous vehicle takes an action such as alerting the driver, handing over operation of the autonomous vehicle to the driver, etc. If the GPS rationality diagnostics program does not indicate a matured fault, the GPS data is verified for rationality and a 'GPS Rationality Fault Active=False' signal is reported. In box 718, the runnable program is ended.

FIG. 8 shows a plan view 800 of a road section having an autonomous vehicle thereon. The road section is shown with respect to a coordinate system oriented with a longitudinal ($\lambda$) axis along an east-west direction of the Earth and a latitude ($\varphi$) axis along a north-south direction of the Earth. The plan view 800 shows a first location 802 of an autonomous vehicle at a first time and a second location 804 of the autonomous vehicle at a second time later than the first time. The autonomous vehicle moves from the first location 802 at the first time to the second location 804 at the second time, covering a distance d in the process. For small distances between the first location 802 and second location 804, it is possible to convert GPS location data on the earth's surface to a planar surface using equi-rectangular approximations to the autonomous vehicle's GPS location. The rectangular approximation can be used in order to calculate the distance d traveled by the autonomous vehicle based on the GPS data.

In particular, the longitudinal component (dx) of the distance d is given by Eq. (1):

$$dx = R \cdot \Delta\lambda \cdot \cos \varphi_m \qquad \text{Eq. (1)}$$

where R represents the earth's average radius, $\Delta\lambda$ represents the change in longitude between the first location 802 and the second location 804 and $\varphi_m$ is the mean latitude between the first location 802 and the second location 804. The lateral component (dy) of the distance d is given by Eq. (2):

$$dy = R \cdot \Delta\varphi \qquad \text{Eq. (2)}$$

where $\Delta\varphi$ represent the change in latitude between the first location 802 and the second location 804. The total distance d travelled can thus be calculated from the values calculated in Eq. (1) and Eq. (2) using the Pythagorean Theorem, as shown in Eq. (3):

$$d = \sqrt{dx^2 + dy^2} \qquad \text{Eq. (3)}$$

The distance travelled can also be calculated using vehicle parameters, as shown in Eq. (4):

$$s = V_{avg} \cdot \Delta t \qquad \text{Eq. (4)}$$

where s is the distance calculated using vehicle parameters, $V_{avg}$ is the average speed over the time period between the first location 802 and the second location 804 and $\Delta t$ is the time required to move from the first location 802 to the second location 804.

The distance d calculated using GPS data is compared to the distance s calculated using vehicle parameters. When the absolute value of the difference between these two distances is less than a selected distance threshold, as shown in Eq. (5):

$$|d-s| < \text{Distance\_Threshold} \qquad \text{Eq. (5)}$$

then the data is considered to pass a distance check for rationality. Passing the distance check however is not sufficient to prove that the GPS data is rational. The heading calculated from the GPS data is also checked.

Referring still to FIG. 8, a heading angle θ relative to True North derived from GPS data can be represented as shown in Eq. (6):

$$\theta = \begin{cases} \tan^{-1}\frac{dx}{dy}, & \text{if } dx \geq 0, dy \geq 0, \text{ i.e., } 0 \leq \theta \leq \frac{\pi}{2} \\ \tan^{-1}\frac{dx}{dy} + \pi, & \text{if } dx \geq 0, dy < 0, \text{ i.e., } \frac{\pi}{2} \leq \theta \leq \pi \\ \tan^{-1}\frac{dx}{dy} + \pi, & \text{if } dx < 0, dy < 0, \text{ i.e., } \pi \leq \theta \leq \frac{3\pi}{2} \\ \tan^{-1}\frac{dx}{dy} + 2\pi, & \text{if } dx < 0, dy \geq 0, \text{ i.e., } \frac{3\pi}{2} \leq \theta \leq 2\pi \end{cases} \qquad \text{Eq. (6)}$$

The derived heading θ derived from GPS data should be close to a reported heading $\theta_{rept}$ determined using vehicle dynamics. Eq. (7) is a shows a comparison between heading value:

$$|\theta - \theta_{rept}| < \text{Angle\_Threshold} \qquad \text{Eq. (7)}$$

A yaw rate of the autonomous vehicle can be determined using a change in heading angle over a time period. Eq. (8) shows a comparison between angular change rate values:

$$\left|\frac{\Delta\theta}{\Delta t} - \omega\right| < \text{YawRate\_Threshold} \qquad \text{Eq. (8)}$$

where Δθ/Δt is the yaw rate determined from GPS data and ω is the reported yaw rate determined from vehicle dynamics. When both Eqs. (7) and (8) are satisfied, the GPS data passes a heading check for rationality.

Figure 9:
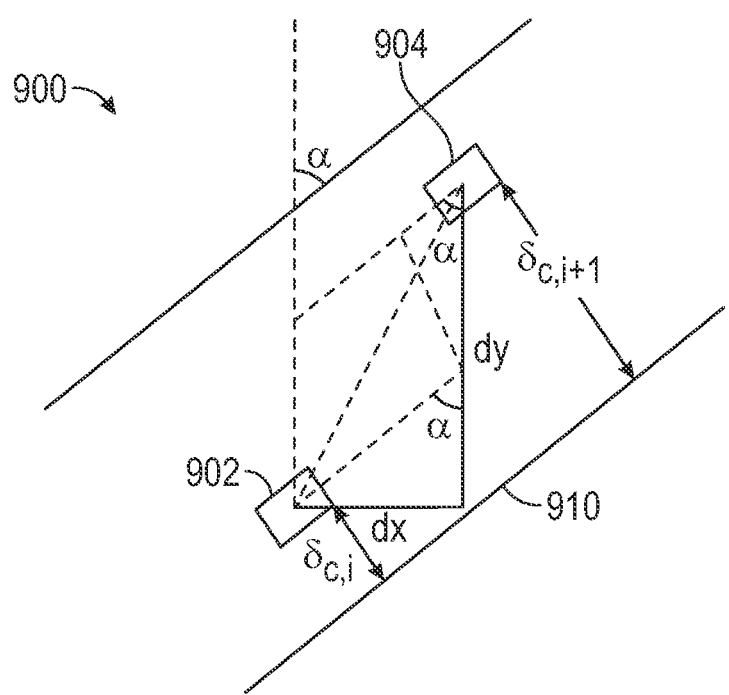
FIG. 9 shows a plan view of a lane of a road section having an autonomous vehicle thereon.

FIG. 9 shows a plan view 900 of a lane of a road section having an autonomous vehicle thereon. The plan view 900 illustrates a data rationality test based on the ability of the GPS data to correctly place the autonomous vehicle with respect to road markings and other permanent fixtures of the road section. The plan view 900 shows a first location 902 of an autonomous vehicle at a first time and a second location 904 of the autonomous vehicle at a second time after the first time.

The autonomous vehicle moves from the first location 902 at the first time to be at the second location 904 at the second time. At the first location 902, the lateral offset of the autonomous vehicle relative to a right lane marking 910 is indicated by $\delta_{g,i}$ where the index g indicates that the offset is based on GPS data and the index i indicates the time step. Lateral offset can also be determined using vehicle-sensed parameters such as form the FCM 606 (FIG. 6). For FCM data, the offset is indicated by $\delta_{c,i}$ where the index c indicates that the offset is based on FCM data and the index i indicates the time step. The longitudinal component dx and lateral components can be determined from the $i^{th}$ time step to the $(i+1)^{th}$ time step using the GPS data. These components can then be used to determine changes in lateral offset as discussed with respect to Eqs. (9)-(18).

The following conditions are the change in lateral offset from time step i to time step i+1, based on different quadrants. When dy≥0, dx≥0 and dy·sin α≥dx·cos α, $$\left(0 \leq \alpha \leq \frac{\pi}{2}\right),$$

then:

$$|\delta_{g,i+1} - \delta_{g,i}| = (dy - dx \cdot \cot \alpha) \cdot \sin \alpha = dy \cdot \sin \alpha - dx \cdot \cos \alpha \qquad \text{Eq. (9)}$$

where α indicates an angle between the road heading and True North. When dy≥0, dx≥0 and dy·sin α<dx·cos α, $$\left(0 \leq \alpha \leq \frac{\pi}{2}\right):$$

$$|\delta_{g,i+1} - \delta_{g,i}| = dx \cdot \cos \alpha - dy \cdot \sin \alpha \qquad \text{Eq. (10)}$$

When dy < 0, dx ≥ 0 and dx·cos α ≥ dy·sin α, $\left(\frac{\pi}{2} \leq \alpha \leq \pi\right)$:

$$|\delta_{g,i+1} - \delta_{g,i}| = dx \cdot \cos \alpha - dy \cdot \sin \alpha \qquad \text{Eq. (11)}$$

When dy < 0, dx ≥ 0 and dx·cos α < dy·sin α, $\left(\frac{\pi}{2} \leq \alpha \leq \pi\right)$:

$$|\delta_{g,i+1} - \delta_{g,i}| = dy \cdot \sin \alpha - dx \cdot \cos \alpha \qquad \text{Eq. (12)}$$

When dy < 0, dx < 0 and dy·sin α ≥ dx·cos α, $\left(\pi < \alpha < \frac{3\pi}{2}\right)$:

$$|\delta_{g,i+1} - \delta_{g,i}| = dy \cdot \sin \alpha - dx \cdot \cos \alpha \qquad \text{Eq. (13)}$$

When dy < 0, dx < 0 and dy·sin α < dx·cos α, $\left(\pi < \alpha < \frac{3\pi}{2}\right)$:

$$|\delta_{g,i+1} - \delta_{g,i}| = dx \cdot \cos \alpha - dy \cdot \sin \alpha \qquad \text{Eq. (14)}$$

When dy ≥ 0, dx < 0 and dx·cos α ≥ dy·sin α, $\left(\frac{3\pi}{2} \leq \alpha < 2\pi\right)$:

$$|\delta_{g,i+1} - \delta_{g,i}| = dx \cdot \cos \alpha - dy \cdot \sin \alpha \qquad \text{Eq. (15)}$$

When dy ≥ 0, dx < 0 and dx·cos α < dy·sin α, $\left(\frac{3\pi}{2} \leq \alpha < 2\pi\right)$:

$$|\delta_{g,i+1} - \delta_{g,i}| = dy \cdot \sin \alpha - dx \cdot \cos \alpha \qquad \text{Eq. (16)}$$

Based on the above analysis, the general expression of the lateral offset change of GPS location is:

$$|\delta_{g,i+1} - \delta_{g,i}| = |dy \cdot \sin \alpha - dx \cdot \cos \alpha| \qquad \text{Eq. (17)}$$

Data from the FCM 606 can also be used to detect lateral offset with respect to right lane marking. Such change in lateral offset is indicated as $|\delta_{c,i+1} - \delta_{c,i}|$. When the difference between the calculated changes in lateral offset is less than a threshold, as shown in Eq. (18):

$$\text{Abs}(|\delta_{g,i+1} - \delta_{g,i}| - |\delta_{c,i+1} - \delta_{c,i}|) < \text{Offset\_Threshold} \qquad \text{Eq. (18)}$$

then the data passes a lateral offset diagnosis.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an autonomous vehicle, comprising:
   sending a first set of Global Positioning Satellite (GPS) data received at a transceiver over a first communication channel to a control system of the autonomous vehicle;
   sending a second set of GPS data received at the transceiver over a second communication channel to the control system of the autonomous vehicle, wherein the second set of GPS data is an authenticated data set;
   comparing the first set of GPS data to the second set of GPS data to verify the first set of GPS data;
   determining a rationality of the first set of GPS data by measuring a degree to which a motion of the autonomous vehicle as predicted using the GPS data matches the actual motion of the autonomous vehicle using the first set of GPS data; and
   controlling, by a controller of the control system, a vehicle system to navigate the autonomous vehicle along a trajectory based on the first set of GPS data.

2. The method of claim 1, wherein the first communication channel is an Ethernet communication channel and the second communication channel is a Controller Area Network.

3. The method of claim 1, wherein comparing the first set of GPS data to the second set of GPS data further comprises comparing a timestamp of the first set of GPS data to a timestamp of the second set of GPS data.

4. The method claim 3, further comprising verifying an integrity of the first set of GPS data from a signal-by-signal comparison of the first set of GPS data to the second set of GPS data.

5. The method of claim 1, further comprising:
   calculating a first value for a parameter of the autonomous vehicle using the first set of GPS data;
   calculating a second value for the parameter of the autonomous vehicle using a set of data obtained at a vehicle-based sensor; and
   determining the rationality of the first set of GPS data when a difference between the first value and the second value is less than a selected threshold.

6. The method of claim 5, wherein the parameter of the autonomous vehicle is at least one of: (i) a distance travelled by the autonomous vehicle; (ii) a heading of the autonomous vehicle; (iii) a yaw rate of the autonomous vehicle; and (iv) a lateral offset of the autonomous vehicle.

7. The method of claim 1, further comprising receiving the first set of GPS data and storing the first set of GPS data in a circular buffer and comparing the second set of GPS data to the first set of GPS data within a window of the circular buffer.

8. The method of claim 1, further comprising operating the autonomous vehicle in a failure mode when comparison of the first set of GPS data to the second set of GPS data fails to verify the first set of GPS data.

9. A system for operating an autonomous vehicle, comprising:
   a transceiver configured to send a first set of Global Positioning Satellite (GPS) data over a first communication channel and a second set of GPS data over a second communication channel, wherein the second set of GPS data is an authenticated data set; and
   a processor configured to:
   compare the first set of GPS data to the second set of GPS data to verify the first set of GPS data;
   determine a rationality of the first set of GPS data by measuring a degree to which a motion of the autonomous vehicle as predicted using the GPS data matches the actual motion of the autonomous vehicle using the first set of GPS data; and
   control a vehicle system to navigate the autonomous vehicle along a trajectory based on the first set of GPS data.

10. The system of claim 9, wherein the processor is further configured to compare a timestamp of the first set of GPS data to a timestamp of the second set of GPS data.

11. The system of claim 10, wherein the processor is further configured to verify an integrity of the first set of GPS data from a signal-by-signal comparison of the first set of GPS data to the second set of GPS data.

12. The system of claim 9, wherein the processor is further configured to:
   calculate a first value for a parameter of the autonomous vehicle using the first set of GPS data;
   calculate a second value for the parameter of the autonomous vehicle using a set of data obtained at a vehicle-based sensor; and
   determine the rationality of the first set of GPS data when a difference between the first value and the second value is less than a selected threshold.

13. The system of claim 12, wherein the parameter of the autonomous vehicle is at least one of: (i) a distance travelled by the autonomous vehicle; (ii) a heading of the autonomous vehicle; (iii) a yaw rate of the autonomous vehicle; and (iv) a lateral offset of the autonomous vehicle.

14. The system of claim 9, wherein the processor is further configured to store the first set of GPS data in a circular buffer and compare the second set of GPS data to the first set of GPS data within a window of the circular buffer.

15. An autonomous vehicle, comprising:
   a transceiver configured to send a first set of Global Positioning Satellite (GPS) data over a first communication channel and a second set of GPS data over a second communication channel, wherein the second set of GPS data is an authenticated data set; and
   a processor configured to:
   compare the first set of GPS data to the second set of GPS data to verify the first set of GPS data;
   determine a rationality of the first set of GPS data by measuring a degree to which a motion of the autonomous vehicle as predicted using the GPS data matches the actual motion of the autonomous vehicle using the first set of GPS data; and
   control a vehicle system to navigate the autonomous vehicle along a trajectory based on the first set of GPS data.

16. The autonomous vehicle of claim 15, wherein the processor is further configured to compare a timestamp of the first set of GPS data to a timestamp of the second set of GPS data.

17. The autonomous vehicle of claim 16, wherein the processor is further configured to verify an integrity of the first set of GPS data from a signal-by-signal comparison of the first set of GPS data to the second set of GPS data.

18. The autonomous vehicle of claim 15, wherein the processor is further configured to:
   calculate a first value for a parameter of the autonomous vehicle using the first set of GPS data;
   calculate a second value for the parameter of the autonomous vehicle using a set of data obtained at a vehicle-based sensor; and
   determine the rationality of the first set of GPS data when a difference between the first value and the second value is less than a selected threshold.

19. The autonomous vehicle of claim 18, wherein the parameter of the autonomous vehicle is at least one of: (i) a distance travelled by the autonomous vehicle; (ii) a heading of the autonomous vehicle; (iii) a yaw rate of the autonomous vehicle; and (iv) a lateral offset of the autonomous vehicle.

20. The autonomous vehicle of claim 15, wherein the processor is further configured to store the first set of GPS data in a circular buffer and compare the second set of GPS data to the first set of GPS data within a window of the circular buffer.

\* \* \* \* \*